(12) United States Patent
Meixner et al.

(10) Patent No.: US 11,321,802 B2
(45) Date of Patent: May 3, 2022

(54) LARGE LOOKUP TABLES FOR AN IMAGE PROCESSOR

(71) Applicant: GOOGLE LLC, Mountain View, CA (US)

(72) Inventors: Albert Meixner, Mountain View, CA (US); Dustin Michael DeWeese, Mountain View, CA (US)

(73) Assignee: Google LLC, Mountain View, CA (US)

( * ) Notice: Subject to any disclaimer, the term of this patent is extended or adjusted under 35 U.S.C. 154(b) by 47 days.

(21) Appl. No.: 16/976,316

(22) PCT Filed: Feb. 21, 2019

(86) PCT No.: PCT/US2019/019020
§ 371 (c)(1),
(2) Date: Aug. 27, 2020

(87) PCT Pub. No.: WO2019/168739
PCT Pub. Date: Sep. 6, 2019

(65) Prior Publication Data
US 2021/0042875 A1 Feb. 11, 2021

Related U.S. Application Data

(60) Provisional application No. 62/636,055, filed on Feb. 27, 2018.

(51) Int. Cl.
*G06T 1/20* (2006.01)
*G06F 9/30* (2018.01)
(Continued)

(52) U.S. Cl.
CPC ............... *G06T 1/20* (2013.01); *G06F 8/441* (2013.01); *G06F 8/443* (2013.01); *G06F 8/445* (2013.01);
(Continued)

(58) Field of Classification Search
None
See application file for complete search history.

(56) References Cited

U.S. PATENT DOCUMENTS

| | | | | |
|---|---|---|---|---|
| 5,038,300 A | * | 8/1991 | Seiler | G09G 5/06 345/602 |
| 6,397,324 B1 | * | 5/2002 | Barry | G06F 9/3004 711/149 |

(Continued)

FOREIGN PATENT DOCUMENTS

| | | |
|---|---|---|
| CN | 105874437 | 8/2016 |
| TW | 201737201 | 10/2017 |

(Continued)

OTHER PUBLICATIONS

U.S. Appl. No. 14/694,806, filed Apr. 23, 2015, Meixner et al.
(Continued)

*Primary Examiner* — Steven G Snyder
(74) *Attorney, Agent, or Firm* — Fish & Richardson P.C.

(57) ABSTRACT

Methods, systems, and apparatus, including computer programs encoded on computer storage media, for supporting large lookup tables on an image processor. One of the methods includes receiving an input kernel program for an image processor having a two-dimensional array of execution lanes, a shift-register array, and a plurality of memory banks. If the kernel program has an instruction that reads a lookup table value for a lookup table partitioned across the plurality of memory banks, the instruction in the kernel program are replaced with a sequence of instructions that, when executed by an execution lane, causes the execution lane to read a first value from a local memory bank and a second value from the local memory bank on behalf of another execution lane belonging to a different group of execution lanes.

21 Claims, 9 Drawing Sheets

(51) Int. Cl.
  *G06F 9/38* (2018.01)
  *G06T 1/60* (2006.01)
  *G06F 8/41* (2018.01)

(52) U.S. Cl.
  CPC .............. *G06F 8/45* (2013.01); *G06F 9/3004* (2013.01); *G06F 9/30036* (2013.01); *G06F 9/3887* (2013.01); *G06F 9/3891* (2013.01); *G06T 1/60* (2013.01)

(56) References Cited

U.S. PATENT DOCUMENTS

| | | | |
|---|---|---|---|
| 7,499,199 B2 | 3/2009 | Kurumisawa et al. | |
| 10,409,596 B2* | 9/2019 | Cho | G06F 9/3004 |
| 10,552,939 B1* | 2/2020 | Meixner | G06T 1/20 |
| 10,853,908 B2* | 12/2020 | Meixner | G06T 1/60 |
| 2013/0212353 A1* | 8/2013 | Mimar | G06F 9/345 712/4 |
| 2013/0275548 A1 | 10/2013 | Molaro et al. | |
| 2016/0335185 A1 | 11/2016 | Kwon et al. | |
| 2017/0249717 A1 | 8/2017 | Meixner et al. | |
| 2017/0344369 A1* | 11/2017 | Cho | G06F 12/0207 |
| 2018/0005347 A1 | 1/2018 | Meixner et al. | |
| 2020/0258190 A1* | 8/2020 | Meixner | G06T 1/20 |

FOREIGN PATENT DOCUMENTS

| | | | | |
|---|---|---|---|---|
| WO | WO-0198892 A1 * | 12/2001 | ........... | G06F 9/3885 |
| WO | WO 2016/171846 | 10/2016 | | |

OTHER PUBLICATIONS

U.S. Appl. No. 14/694,815, filed Apr. 23, 2015, Meixner et al.
U.S. Appl. No. 14/694,828, filed Apr. 23, 2015, Zhu et al.
U.S. Appl. No. 14/960,334, filed Dec. 4, 2015, Vasilyev et al.
U.S. Appl. No. 15/352,260, filed Nov. 15, 2016, Redgrave.
PCT International Search Report and Written Opinion in International Appln. No. PCT/US2019/019020, dated Jul. 3, 2019, 14 pages.

* cited by examiner

LARGE LOOKUP TABLES FOR AN IMAGE PROCESSOR

BACKGROUND

This specification relates to image processors.

Image processors are programmable, domain-specific parallel processing devices that are designed to take advantage of two-dimensional spatial locality in image data. Image processors are designed to efficiently process existing image data, which distinguishes graphics processing units (GPU), which are designed to generate images in the first instance from an internal representation.

Image processors are designed for high-efficiency, low-power, parallel execution of workloads with two-dimensional spatial locality. A computing task has two-dimensional spatial locality when output data for a location in the input data is dependent on data that neighbors or is nearby the location in the input data. For example, a 3×3 blur filter can use data in a 9-pixel square region of input image data in order to compute an output value for a pixel at the center of the square region. In other words, the blur filter has spatial locality because the output value used only data from neighboring pixels. Image processors can also be used for high performance parallel execution of workloads in other domains, including computer vision, object recognition, and neural networks.

Programming an image processor typically requires writing and compiling a kernel program, which is then executed concurrently by each of a plurality of execution lanes. Each execution lane is itself a component that can execute instructions and store data in one or more registers.

Some image processors take advantage of spatial locality by coupling an array of execution lanes with an array of shift registers. This arrangement allows each execution lane to access data required for its kernel program by shifting the input data within the array of shift registers rather than performing memory accesses. Conceptually, this can be thought of shifting an array of image data beneath an array of execution lanes. For example, an execution lane can access data required to compute a blur filter by repeatedly reading data shifted in snake-scan order: two pixels to the left, one pixel down, two pixels to the right, one pixel down, and two pixels to the left.

This strategy works well when the kernel programs are not data-dependent. A blur filter, for example, is not data-dependent because the kernel program performs the same data access patterns regardless of the values of the input pixels. When a kernel program is not data-dependent, a compiler can pre-schedule all data movement by generating instructions to shift data by patterns that can be predicted in advance, e.g., in the snake-scan order described above. However, some kernel programs are data-dependent. In other words, the data accessed by the execution lanes can change depending on the input data. Therefore, the compiler cannot schedule the access patterns in advance, which have to be computed at runtime.

One class of kernel programs that are data-dependent includes kernel programs that make use of lookup tables. A lookup table is a data structure that maps input values to precomputed output values. Lookup tables are often used to reduce runtime computations. For example, a lookup table can map color image values to corresponding grayscale counterparts, which avoids runtime conversions between formats. When a kernel program makes use of lookup tables, the compiler generates a sequence of instructions for performing a random memory access to obtain a lookup table value in memory. The sequence of instructions typically includes 1) computing an index from the input data, 2) computing a memory address from the index, and 3) reading from the computed memory address.

An image processor can use lookup tables so long as the lookup table fits within memory that is accessible by each execution lane. This can be a problem for large lookup tables. In order to maximize speed, execution lanes of an image processor often do not have access to caches or main memory. Instead, execution lanes may have access only to one or more local memory banks that are designed for speed instead of capacity, e.g., SRAM. The problem is worse if the local memory is split into multiple, smaller memory banks that are each accessible by only a subset of execution lanes. In that case, a lookup table needs to be replicated in every local memory bank. If a lookup table of a particular kernel program does not fit within each local memory bank, compilation of the program may not be possible.

SUMMARY

This specification describes how a compiler for an image processor can generate program code to support large lookup tables. In this context, a large lookup table is a lookup table that, for one or more local memory banks accessible by execution lanes of the image processor, the table is too big to fit in those memory banks. The compiler can support large lookup tables by effectively distributing portions of a lookup table across multiple local memory banks. This means that each execution lane can access only a portion of the lookup table. The compiler can make accessible the remaining lookup table data by generating code that causes the needed indexes and values to be read by other execution lanes and to be shifted in by using a shift-register array.

In this specification, a lookup table is a data structure that maps indexes to values at runtime. Lookup tables are common in many image processing algorithms and applications. For example, lookup tables can be used for complex function approximation. As another example, the Rapid and Accurate Image Super Resolution (RAISR) algorithm relies on large lookup tables to obtain specially learned filters for accessing image data.

In this specification, a partitioned lookup table means that no single memory bank contains all values of the table. Being partitioned implies only distribution, but does not necessarily imply data exclusivity. Rather, some values can be duplicated in multiple memory banks.

In this specification, a local memory bank is a memory bank that is accessible by a particular execution lane. Thus, whether a memory bank is considered local or remote depends on the specifies of a particular execution lane.

In this specification, a group of execution lanes includes all execution lanes that can access the same local memory bank.

In this specification, a shift-register array is a hardware device that logically arranges shift registers in a two-dimensional layout such that neighboring shift registers can shift data to one another, often during a single clock cycle. Shift-register arrays are typically implemented as a ring or a torus so that data from one edge of the shift-register array can be shifted directly to the other edge of the shift-register array.

In this specification, a shift access sequence is a sequence of kernel program instructions that instruct an execution lane to read a first value from a local memory bank and a second value from the local memory bank on behalf of a different execution lane belonging to a different group of execution lanes.

In this specification, a vector access sequence is a sequence of kernel program instructions that allow an execution lane to obtain multiple values of a structured data object having a fixed address pattern partitioned across multiple memory banks. A vector access sequence thus also instructs an execution lane to read at least a first value from a local memory bank and a second value from the local memory bank on behalf of a different execution lane belonging to a different group of execution lanes. A vector access sequence also includes instructions for recovering the original ordering of the structured data object.

Particular embodiments of the subject matter described in this specification can be implemented so as to realize one or more of the following advantages. Providing support for large lookup tables provides an image processor with additional computing capabilities. In particular, an image processor can perform many additional computing algorithms that rely on large lookup tables, e.g., the RAISR algorithm or algorithms for complex function approximation. Generating a shift access sequence also boosts the storage size of lookup tables that can be used by an image processor. Generating a vector access sequence provides such a boost to the storage size and without incurring a substantial performance decrease from discarding unwanted data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
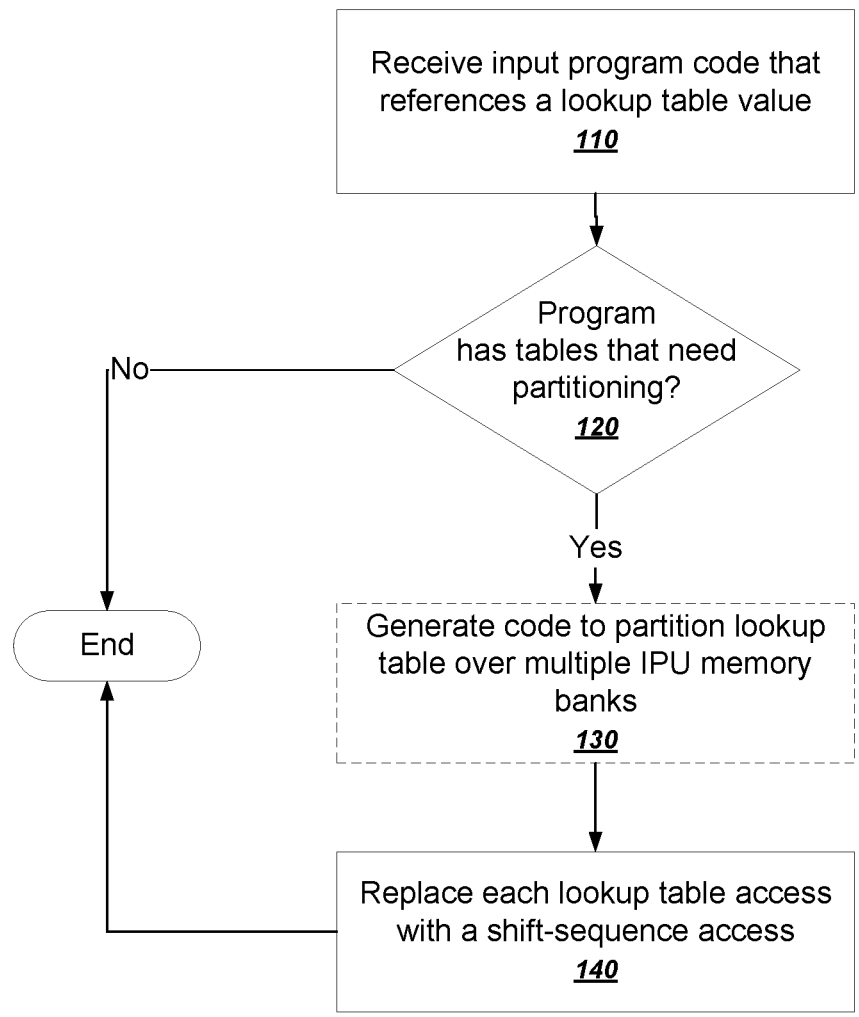
FIG. 1 is a flowchart of an example process for reading values of a lookup table partitioned over multiple memory banks.

FIG. 1 is a flowchart of an example process for reading values of a lookup table partitioned over multiple memory banks. The example process can be performed by any appropriately programmed computer system, e.g., by a compiler, an assembler, or a program optimizer for an image processor, to name just a few examples. For convenience, the example process will be described as being performed by an appropriately programmed system of one or more computers.

The system receives input program code that references a lookup table value (110). The input program code can be in any appropriate programming language that can define lookup tables to be stored in local memory banks of an image processor. For example, the program code can be in a high-level programming language, e.g., C or Halide; an intermediate language representation; or a lower-level programming language, e.g., assembly language code, object code.

For example, the input program code can declare an array or a buffer as a lookup table, either explicitly or implicitly. For example, an array named "lut" can be treated by the compiler as a lookup table. The compiler can thus support such statements as "a=lut[x]", where lut is an array or buffer treated as a lookup table and x is a lookup table index.

The system determines whether the program has a lookup table that needs partitioning (120). In general, a lookup table can be partitioned when the entire lookup table does not fit within at least one local memory bank of the image processor. Thus, the system can compute the total size of a lookup table declared in the input program and determine whether the total size will fit within each local memory bank of the image process. If not, the system can determine the that lookup table needs partitioning.

The system can also take into account a total size of all lookup tables in the program. If the total size of all lookup tables is greater than the size of at least one local memory bank, the system can select one or more lookup tables for partitioning. In some implementations, the system computes an iterative process by repeatedly selecting a next lookup table for partitioning and then redetermining whether all the partitioned and unpartitioned tables will fit in all the local memory banks of the image processor. For example, the system can perform this iterative process in an order defined by respective sizes of the lookup tables, starting with the largest lookup table or a smallest lookup table.

The system can also take into account program language directives. Some programming languages may support annotations that designate particular lookup tables as being candidates for partitioning or as necessarily requiring partitioning. If a lookup table is annotated as a candidate for partitioning, the system can for example only partition the table if necessary according to table size, and then can iterate through all lookup tables annotated as candidates. If a lookup table is annotated as required to be partitioned, the system can first partition the lookup table before considering those tables only annotated as candidates or unannotated lookup tables.

If no lookup tables need to be partitioned, the process ends (branch to end) without the system modifying any program code.

If a lookup table needs to be partitioned, the system optionally generates code to partition the lookup table over multiple IPU memory banks (branch to 130). In general, the system can partition the lookup table by interleaving the data values by N steps over the multiple IPU memory banks for N partitions. As mentioned above, a partition in this context need not be unique and can instead be duplicated across multiple memory banks.

For example, if the lookup table is partitioned into two partitions, e.g., N=2, the system can generate code that stores all even indexes in some memory banks and all odd indexes in other memory banks. If there are four partitions, the system can generate code that places the 1st, 5th, 9th, etc., index in some memory banks, every 2nd, 6th, 10th, etc., index in another memory bank, and so on. In general, the system can interleave the values so that there is a relatively simple, and therefore fast, way to compute a partitioned index from an original lookup table index. Computing partitioned indexes is described in more detail below with reference to FIG. 2.

Step 130 is described as being optional because other systems or tools can be used to partition the lookup table across the memory banks or to generate code that does the partitioning that is separate and apart from optimizing each lookup table access of a kernel program. For example, an entirely separate kernel program that runs at system start up can partitioned lookup table across the memory banks.

The system replaces each original lookup table access in the program with a shift access sequence (140). As described above, a shift access sequence is a series of instructions that the execution lanes execute in order to obtain a required value from the partitioned lookup table. In general, each execution lane will read a first value from its local memory bank for itself and will receive a remote index and use the remote index to read a second value from its local memory bank on behalf of another execution lane. The second value is then shifted back through the shift-register array to the execution lane that provided the remote index. Each execution lane can then select between the first value read from the local memory bank or another value read from a remote memory bank by another execution lane. As part of this process, the execution lanes effectively shift lookup table indexes one way through the shift-register array and lookup table values back the other way through the shift-register array. This process allows each execution lane to obtain any value in the partitioned lookup table, even when the required value is not stored in the local memory bank for the execution lane. Example shift access sequences are described in more detail below with reference to FIGS. 2 and 3A-B.

After replacing the original lookup tables accesses with shift access sequence, the process ends. The code modified with shift access sequences can then be further compiled or assembled into object code to be executed on an image processor.

Figure 2:
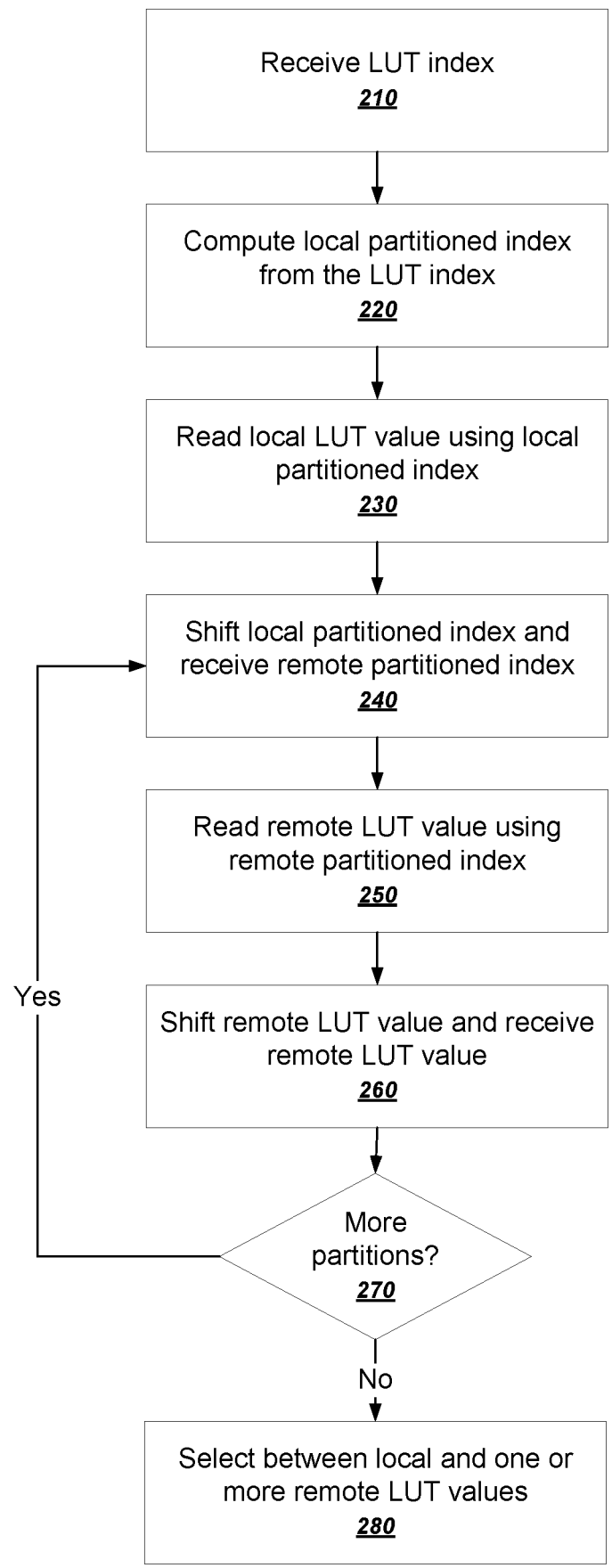
FIG. 2 is a flowchart of an example process for performing a shift access sequence for a partitioned lookup table.

FIG. 2 is a flowchart of an example process for performing a shift access sequence for a partitioned lookup table. Generally multiple execution lanes of an image processor perform the shift access sequence concurrently, e.g., one execution lane per local memory bank. For convenience, the process will be described from the perspective of a single execution lane.

The execution lane receives a lookup table index (210). Receiving a lookup table index typically occurs due to kernel program code that uses the input data, e.g., a pixel value, to generate an index into the lookup table. For example, a kernel program can map a range of possible input values to a particular lookup table index.

The execution lane computes a local partitioned index (220). The local partitioned index is an index into the local memory bank of the execution lane. If the execution lane's local memory bank has the value indicated by the original lookup table index, then the partitioned index will indicate the location of the value in the local memory bank.

If not, the partitioned index will indicate the location of the value within a different, remote memory bank that is local to a different execution lane.

The computation of the partitioned index depends on how the lookup table is partitioned, including how many partitions there are. If the lookup table's values are interleaved in two partitions, for example, the partitioned index can be computed by:

$$partitioned\_index = lut\_index/2$$

where lut_index represents the original lookup table index and the "/" operator indicates integer division with no remainder.

Thus, in general with a lookup table whose values are interleaved in N partitions, the partitioned index can be computed by:

$$partitioned\_index = lut\_index/N.$$

The execution lane reads a local lookup table value using the local partitioned index (230). In other words, the execution lane reads from its local memory bank using the local partitioned index. This generally involves using the local partitioned index as an offset from a base address of the lookup table partition in the local memory bank.

Note that some steps of FIG. 2 are performed in parallel by all execution lanes while others may be sequenced. For example, all execution lanes can receive the LUT index (210) and compute the local partitioned index (220) concurrently. But in some implementations, only one address at a time can be read out of any one local memory bank. Thus, step (230) is an example of an operation that may have to be sequenced among execution lanes that are local to a memory bank.

The execution lane shifts the local partitioned index and receives a remote partitioned index (240). In other words, the execution lanes shuffle their computed local partitioned indexes in the same direction through the shift-register array. In general, the execution lanes shift the data to a corresponding execution lane of a different memory bank. Thus, the 0th execution lane for local memory bank 0 shifts the index to the 0th execution lane for local memory bank 1 and so on. Therefore, the shift amount varies according to how many execution lanes are assigned to the same local memory bank.

Figure 3A:
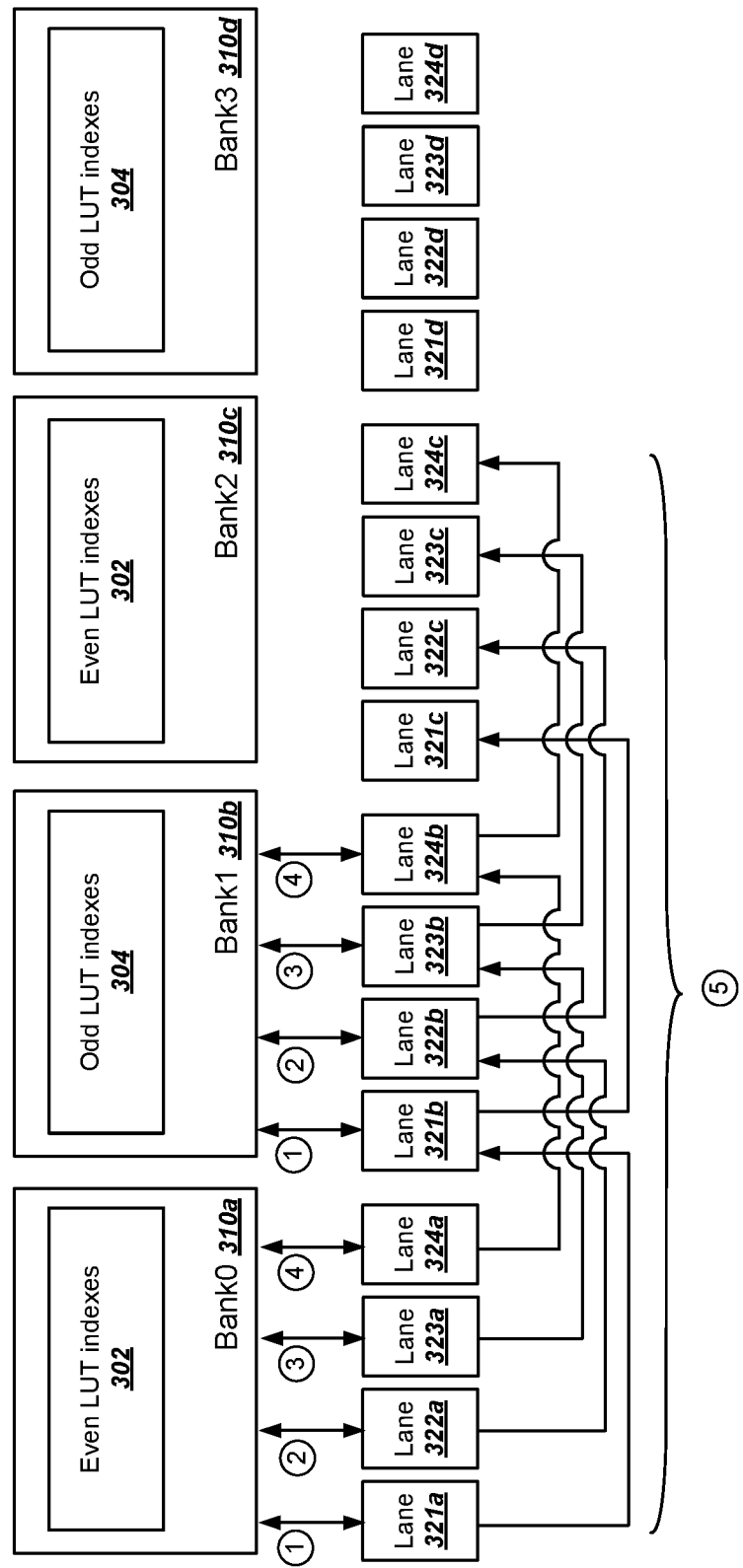
FIG. 3A illustrates an example of reading and shifting with partitioned indexes.

FIG. 3A conceptually illustrates an example of reading and shifting with partitioned indexes. FIG. 3A illustrates a lookup table that has been partitioned into two partitions so that the even lookup table indexes 302 are stored in some memory banks, e.g., the memory banks 310a and 310c, and so that odd lookup table indexes 304 are stored in the other memory banks, e.g., the memory banks 310b and 310d.

In FIG. 3A, the execution lanes can use a shift-register array to shift data to one another. In this example, the shift-register array is arranged as a torus so that shifts from one edge of the shift-register array wrap around to the opposite edge of the shift-register array, both from left to right and top to bottom.

In FIG. 3A all execution lanes for all memory banks are illustrated as residing along a same row for clarity. However, in some image processor implementations, execution lanes that share a memory bank are arranged along a same row or column of the two-dimensional array of execution lanes. Thus, for example, the shifts illustrated as being horizontally to the "east" from the execution lanes 321a-324a to the execution lanes 321b-324b respectively could actually be shifts to the "south," e.g., if the execution lanes 321b-324b were on a different row than the execution lanes 321a-324a. Therefore, although FIG. 3A shows shifting horizontally by four locations, the same operation could actually require shifting by only one location down.

FIG. 3A also illustrates sixteen execution lanes in which groups of four are assigned to each of the four memory banks. As shown, the lanes 321a-324a are assigned to the memory bank 310*a*, the lanes 321*b*-324*b* are assigned to the memory bank 310*b*, the lanes 321*c*-324*c* are assigned to the memory bank 310*c*, and the lanes 321*d*-324*d* are assigned to the memory bank 310*d*.

FIG. 3A also illustrates the hardware limitations of the system that make shift sequences to support partitioned lookup tables necessary. For example, there is no hardware path between execution lane 321*a* and bank1 310*b*. But the execution lane 321*a* can still indirectly access bank1 310*b* through a sequence of shifts through the shift-register array.

FIG. 3A also shows an example sequencing of reads into the local memory bank using the partitioned indexes. Because lanes 321*b*-324*b* share the memory bank 310*b*, only one address can be read at a time. The execution lanes could share the data if the address was the same, but for a lookup table, that situation is unlikely.

Therefore, at step 1, the lane 321*b* reads a local lookup table value using its local partitioned index; at step 2, the lane 322*b* reads a local lookup table value using its local partitioned index; at step 3, the lane 323*b* reads a local lookup table value using its local partitioned index; and at step 4, the lane 324*b* reads a local lookup table value using its local partitioned index. Although not illustrated in FIG. 3A, the system can sequence every other group of execution lanes in the same way. Thus, the lanes 321*a*-324*a* also read local lookup table values at steps 1-4 respectively. The total number of reads in sequence may be determined by the total number of execution lanes assigned to the same memory banks, in this example, four.

At step 5, all the execution lanes shift all the partitioned indexes to a corresponding execution lane in the next group using the shift-register array. Thus, the lane 321*b* shifts its partitioned index to the lane 321*c*; the lane 322*b* shifts its partitioned index to the lane 322*c*; the lane 323*b* shifts its partitioned index to the lane 323*c*; and the lane 324*b* shifts its partitioned index to the lane 324*c*. Although not illustrated in FIG. 3A, every execution lane can shift their partitioned indexes in the same manner concurrently. The hardware of an image processor generally forms a logical ring or torus, such that execution lanes on the edge can shift data to execution lanes on the other edge on a single cycle.

All of the reading and shifting operations of the example image processor can be coordinated by broadcasting instructions of the kernel program to each of the execution lanes. In some implementations, this broadcasting operation is performed by a scalar processor or controller that decodes and broadcasts instructions for the execution lanes. As will be discussed in more detail below, on some steps, some executions perform no operation because the received masked load instruction directs the execution lane to read a value only if the execution lane is in a particular position. These masked load instructions, for example, can drive the sequence of reads in steps 1-4 shown in FIG. 3A. Step 5, on the other hand, involves all execution lanes concurrently shifting data through the shift-register array in response to a shift instruction received by all the execution lanes.

Each execution lane can also receive a remote partitioned index from another execution lane in another group. In this context, remote means that the partitioned index was computed by a different execution lane in another group. Thus, the lane 321*b* receives a remote partitioned index from the lane 321*a*; the lane 322*b* receives a remote partitioned index from the lane 322*a*; the lane 323*b* receives a remote partitioned index from the lane 323*a*; and the lane 324*b* receives a remote partitioned index from the lane 324*a*. Although not illustrated in FIG. 3A, every execution lane can likewise receive remote partitioned indexes from another execution lane in the same manner concurrently.

As shown in FIG. 2, the execution lane reads a remote lookup table value using the remote partitioned index (250). In this context, a remote lookup table value means that the value could be relevant to an execution lane in another group. But the remote lookup table value will not typically be a value needed by the execution lane that does the reading. Rather, the read value will be shifted back to the execution lane that computed the remote partitioned index. Similarly to the local lookup table values, the system can generally sequence the reads of the remote lookup table values because each memory bank can service only one different address at once.

The execution lane shifts the remote lookup table value and receives a remote LUT value (260). In other words, the execution lane shifts the remote lookup table value back to the execution lane that computed the remote partitioned index. The execution lane also receives a remote lookup table value that was read by another execution lane.

Figure 3B:
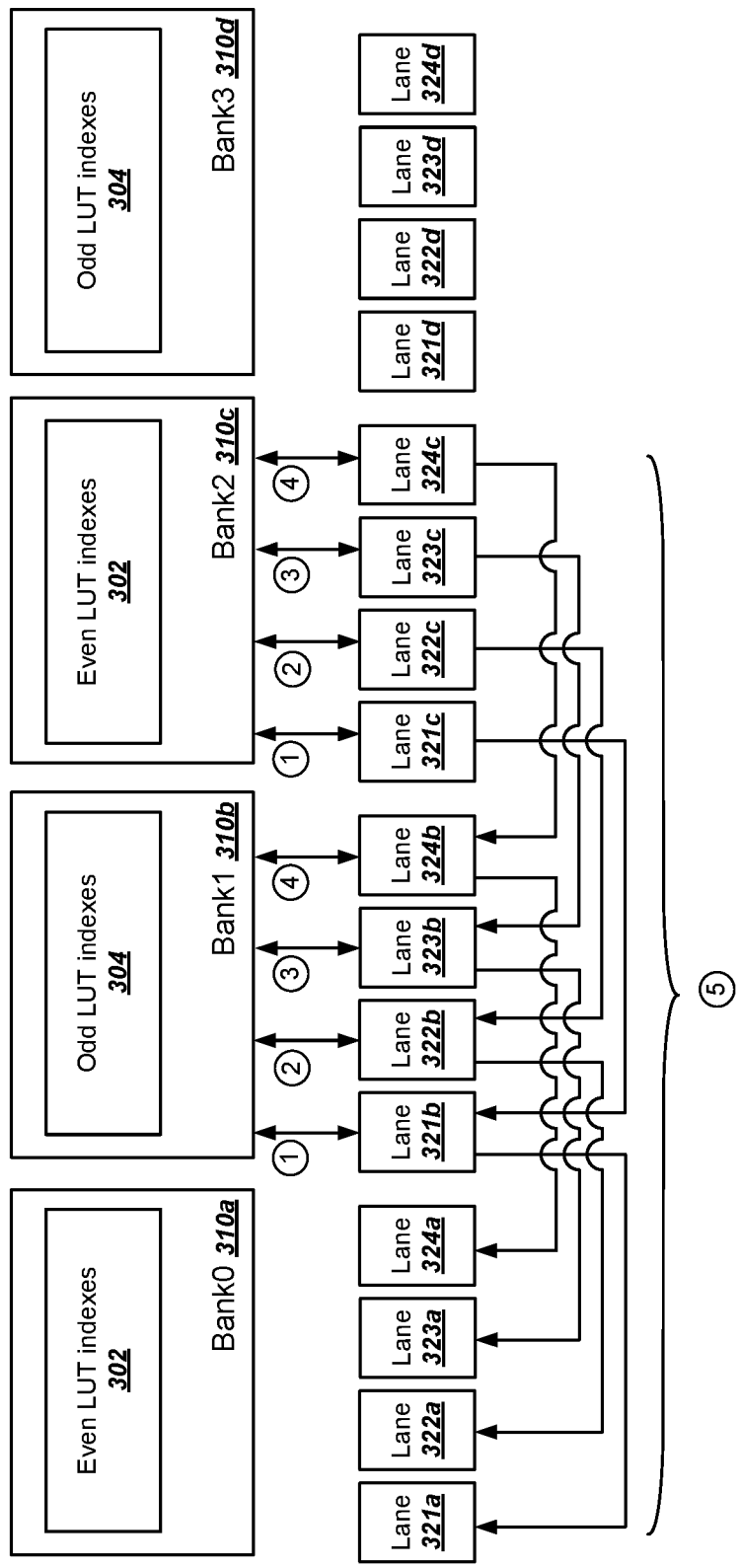
FIG. 3B illustrates reading and shifting remote lookup table values.

FIG. 3B illustrates reading and shifting remote lookup table values. Similarly to FIG. 3A, the reads of the remote lookup table values using the remote partitioned indexes is sequenced among execution lanes in a group. Thus, at step 1, the lane 321*b* reads a remote lookup table value using a remote partitioned index; at step 2, the lane 322*b* reads a remote lookup table value using a remote partitioned index; at step 3, the lane 323*b* reads a remote lookup table value using a remote partitioned index; and at step 4, the lane 324*b* reads a remote lookup table value using a remote partitioned index. And the system can sequence every other group of execution lanes in the same way. Thus, the lanes 321*c*-324*c* also read remote lookup table values at steps 1-4 respectively.

At step 5, all the execution lanes shift all the remote lookup table values back to a corresponding execution lane in the previous group. Thus, the lane 321*b* shifts its remote lookup table value back to the lane 321*a*; the lane 322*b* shifts its remote lookup table value back to the lane 322*c*; the lane 323*b* shifts its partitioned index to the lane 323*c*; and the lane 324*b* shifts its partitioned index to the lane 324*c*. Although not illustrated in FIG. 3A, every execution lane can shift their partitioned indexes in the same manner concurrently.

Each execution lane also receives a remote lookup table value from another execution lane in another group. In this context, remote means that the lookup table value was read by a different execution lane in another group. Thus, the lane 321*b* receives a remote lookup table value from the lane 321*c*; the lane 322*b* receives a remote lookup table value from the lane 322*c*; the lane 323*b* receives a remote lookup table value from the lane 323*c*; and the lane 324*b* receives a remote lookup table value from the lane 324*c*.

FIGS. 3A and 3B illustrated an example in which there were only two partitions. But if there are more than two, the execution lanes can perform additional reads and shifts.

Thus, the system determines whether there are more partitions to be processed (270). If so, the execution lane shifts the received remote partitioned index and receives another remote partitioned index (branch to 240). The execution lane can then use the received remote partitioned index to read another remote lookup table value and to shift the remote lookup table value back to an execution lane in another group.

If there are no more partitions to be processed, the execution lane selects between a local lookup table value and one of one or more remote lookup table values. As described above, in general for N partitions, each execution lane will have read or received N lookup table values. The execution lane can then decide which execution lane is needed for the kernel program.

The execution lane selects between the local lookup table value and one or more remote lookup table values (280). In general, the execution lane can use the original lookup table index modulo N, denoted in this specification as "% N" to determine which of the lookup table values to select for the kernel program. For example, if the table is partitioned into two, e.g., N=2, the execution lane can choose the local lookup table value if index % 2 is equal to the partition number of the execution lane and the remote lookup table value otherwise.

If the lookup table is partitioned into N partitions, the execution lane can choose the local lookup table value if index % N is equal to the partition number of the execution lane. In contrast, the execution lane can choose the (index % N−1)th remote lookup table value otherwise.

Note that for N partitions, each execution lane may always read N values, even when only one value is needed. However, there are situations in which this aspect can be used as an advantage in a way that reduces, or even eliminates entirely, the performance hit from reading multiple values.

One such situation is when the lookup table stores structured data rather than merely individual elements of scalar data. Structured data types include wide data types that occupy the space of multiple registers and vector data types. For these data types, a kernel program will typically read multiple, sequential values from the lookup table. For example, instead of the kernel program accessing just one value at lut[index], the kernel program can specify accessing all values at lut[index], lut[index+1], lut[index+2] . . . up to a particular data width.

Figure 4:
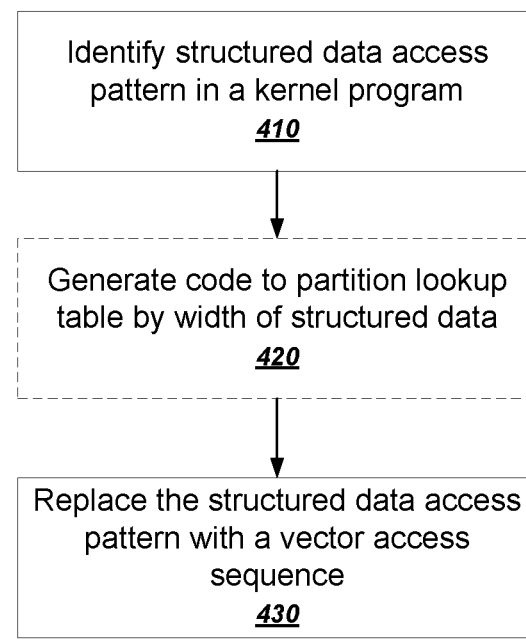
FIG. 4 is a flowchart of an example process for generating a vector access sequence.

FIG. 4 is a flowchart of an example process for generating a vector access sequence. The example process can be performed by any appropriately programmed computer system, e.g., by a compiler, an assembler, or a program optimizer for an image processor, to name just a few examples. For convenience, the example process will be described as being performed by an appropriately programmed system of one or more computers.

The system identifies a structured data access pattern in a kernel program (410). To do so, the system can identify in a portion of the kernel program a number of reads that are contiguous in the lookup table. The system can identify any appropriate number of lookup table reads. In some implementations, the system identifies a structured data access pattern as a number of reads that is equal to the structured data width of the lookup table. Thus, if a vector has a width that is the size of four registers, the system can identify segments of code that have four reads to contiguous portions of the lookup table. In some implementations, the system additionally imposes a closeness constraint by requiring each of the contiguous read instructions to be within a threshold number of instructions of other contiguous read instructions.

In some implementations, the compiler examines each lut instruction and transforms each index into a form of x+N, where x is an arbitrary computed value and N is a constant. The compiler can maintain a table of prior lut instructions having a base of x, and for each new lut instruction having a base of x, the compiler can determine whether another prior lut instruction having a constant N' is part of the same vector. If so, the system can determine to generate a vector access sequence.

The following snippet of code includes a structured data access pattern on lines 8, 10, 12, and 14:

```
// Generate test input
    0, shr.b16 t0 <- y, 1;
    1, add.b16 t1 <- id, t0;
    2, and.b16 t2 <- t1, 7;
    3, shl.b16 t3 <- t2, 2;
    4, add.b16 t4 <- x, y;
    5, and.b16 t5 <- t4, 3;
    6, or.b16 t6 <- t3, t5;
    7, and.b16 t7 <- t6, 65520;
// Four table lookups (t7, t7+1, t7+2, t7+3)
    8, lut.b16 t9 <- ___lookup, t7;
    9, add.b16 t8 <- t7, 1;
    10, lut.b16 t10 <- ___lookup, t8;
    11, add.b16 t8 <- t7, 2;
    12, lut.b16 t11 <- ___lookup, t9;
    13, add.b16 t8 <- t7, 3;
    14, lut.b16 t12 <- ___lookup, t10;
```

In this example, lines 0-7 simply populate the lookup table with test data for a vector having a width of four registers.

Lines 8, 10, 12, and 14 include instructions that read a contiguous group of four values from a lookup table with the instruction "lut.b16."

In this example, the number of lookup table access instructions is equal to a vector width of the vector data in the lookup table. In addition, all the instructions are relatively close together. That is, each of the instructions is within two instructions of the nearest other lookup table access. Therefore, the system can determine to replace this group of lookup table accesses with a vector access sequence.

The system optionally generates code to partition lookup table by a width of the structured data (420). The system can choose the partition count of the lookup table to match the structured data width. For example, if the lookup table stores a double wide data type, a compiler can choose a partition count of two. If the lookup tables stores a vector data type, the compiler can choose a partition count that matches the vector width.

Step 420 is described as being optional because other systems or tools can be used to select the number of partitions based on the structured data width and to partition the lookup table across the memory banks. For example, an entirely separate kernel program that runs at system start up can analyze the instruction access patterns or the structured data width to select a number of partitions and to partition the lookup table across the memory banks.

The system replaces the structured data access pattern with a vector access sequence (430). The vector access sequence causes all execution lanes to automatically read all required values of the structured data by operation of the shift access sequence process. The vector access sequence can be used to read any appropriate structured data, and not just vector data.

The vector access sequence is similar in operation to the shift access sequence process described above, except that each execution lane will use all data values that are read instead of only selecting one of them.

In addition, post-processing is usually necessary to account for the data being read and shifted out of order. The structured data values will be read and shifted to each execution lane in a different order. The order depends on the execution lane's position within other local execution lanes sharing the same memory bank. Therefore, each execution lane can perform a process to recover the original ordering of the multiple values. Thus, the system can generate code having a remapping step that matches all local and remote lookup table values with original structured data elements.

In some implementations, the system generates an intermediate instruction that represents accessing multiple values of structured data. For example, the system could replace lines 8-14 in the example above with the following vector access instruction:

8, lut.b16 t9, t10, t11, t12←_lookup, t7;

The vector access instruction simplifies the determination of where the N outputs belong because the instruction has multiple outputs. Alternatively, the compiler can skip vectorization and instead determine for each lut instruction if the value is already in a prior transpose buffer, which effectively inlines the vectorization.

Figure 5:
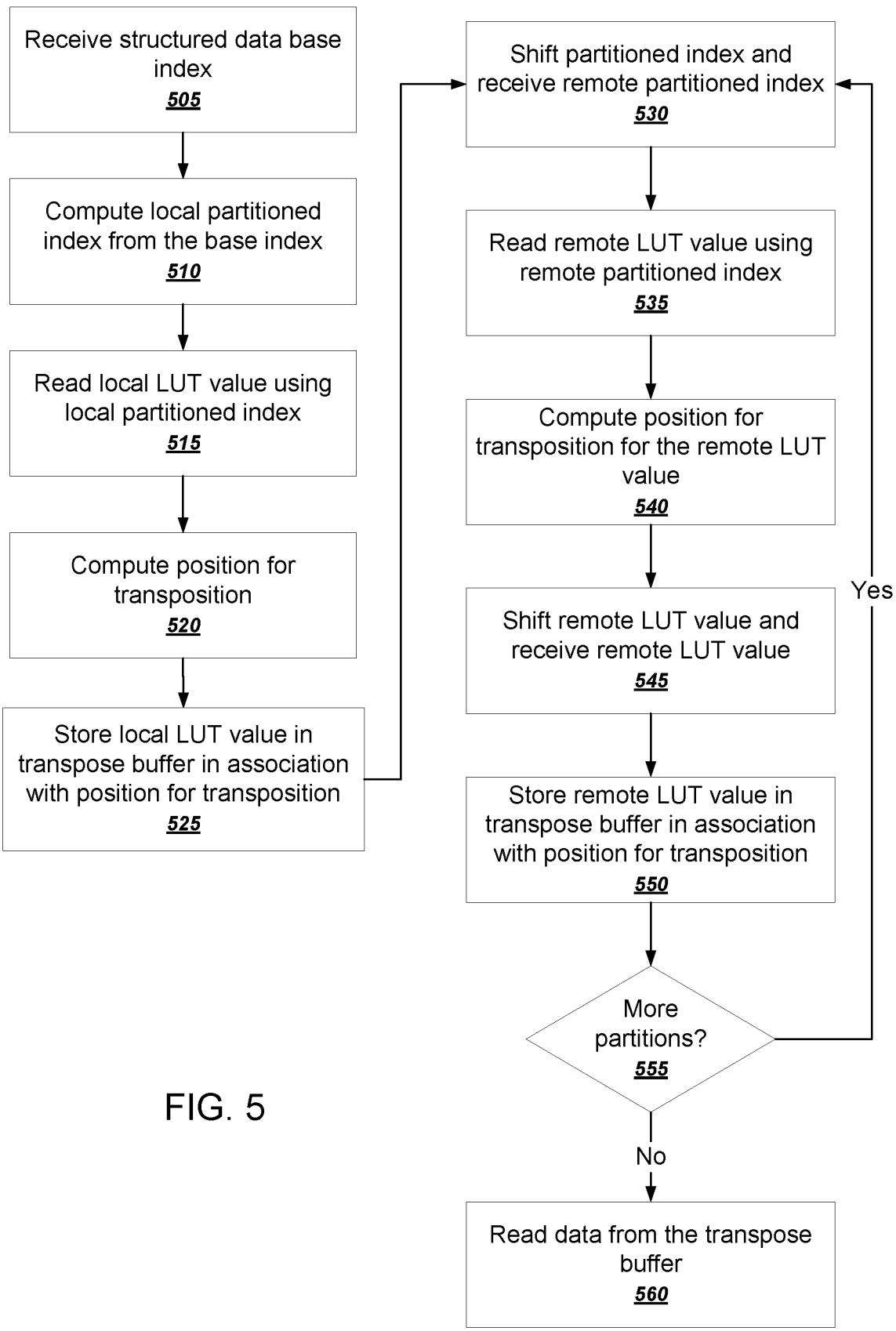
FIG. 5 is a flowchart of an example process for performing a vector access sequence for a partitioned lookup table.

FIG. 5 is a flowchart of an example process for performing a vector access sequence for a partitioned lookup table. In this example, the lookup table has been partitioned by a width of the structured data. As will be seen, some steps are similar to the shift access sequence described above with reference to FIG. 2. However, additional steps are used to recover the original ordering of the data through a transpose buffer. Multiple execution lanes of an image processor can perform the vector access sequence concurrently. For convenience, the process will be described from the perspective of a single execution lane.

The execution lane receives a structured data base index (505). In other words, the execution lane receives the index value in the lookup table for the first value of the structured data, e.g., the index of the first vector element of a vector.

The execution lane computes a local partitioned index from the base index (510). As described above, the computation of the local partitioned index depends on how the data is interleaved and how many partitions there are. When the table is partitioned according to the width of the structured data, the system can compute the local partitioned index by dividing by the width of the structured data.

To continue the example from above, the system can perform the following shift-right instruction to shift a base index by two positions. This operation results in the base index being divided by 4, which is the number of partitions.

8, shr.b16 t1012←t7, 2;

The execution lane can then load the address of the structured data element by adding the partitioned index to a base address of the table (line 9).

9, add.b16 t1013←t1012, 0;

The execution lane reads a local LUT value using the local partitioned index (515). As described above with reference to FIG. 2, this step can be performed serially by all execution lanes that share a same local memory bank.

Thus, to continue the example, the execution lanes can perform the following serialized reads. The "lddm" instruction is a load instruction with a mask. Thus, the instruction will only actually load data when executed by an execution lane having an identifier that matches the mask value.

```
// First table lookup
   11, lddm.b16 t1017 <- 0, 1, t1016;
   12, lddm.b16 t1018 <- t1017, 2, t1016;
   13, lddm.b16 t1019 <- t1018, 4, t1016;
   14, lddm.b16 t1020 <- t1019, 8, t1016;
   15, lddm.b16 t1021 <- t1020, 16, t1016;
   16, lddm.b16 t1022 <- t1021, 32, t1016;
   17, lddm.b16 t1023 <- t1022, 64, t1016;
   18, lddm.b16 t1024 <- t1023, 128, t1016;
```

The execution lane computes a position for transposition (520). As described above, the execution lanes will read the structured data values in different orders.

Figure 6:
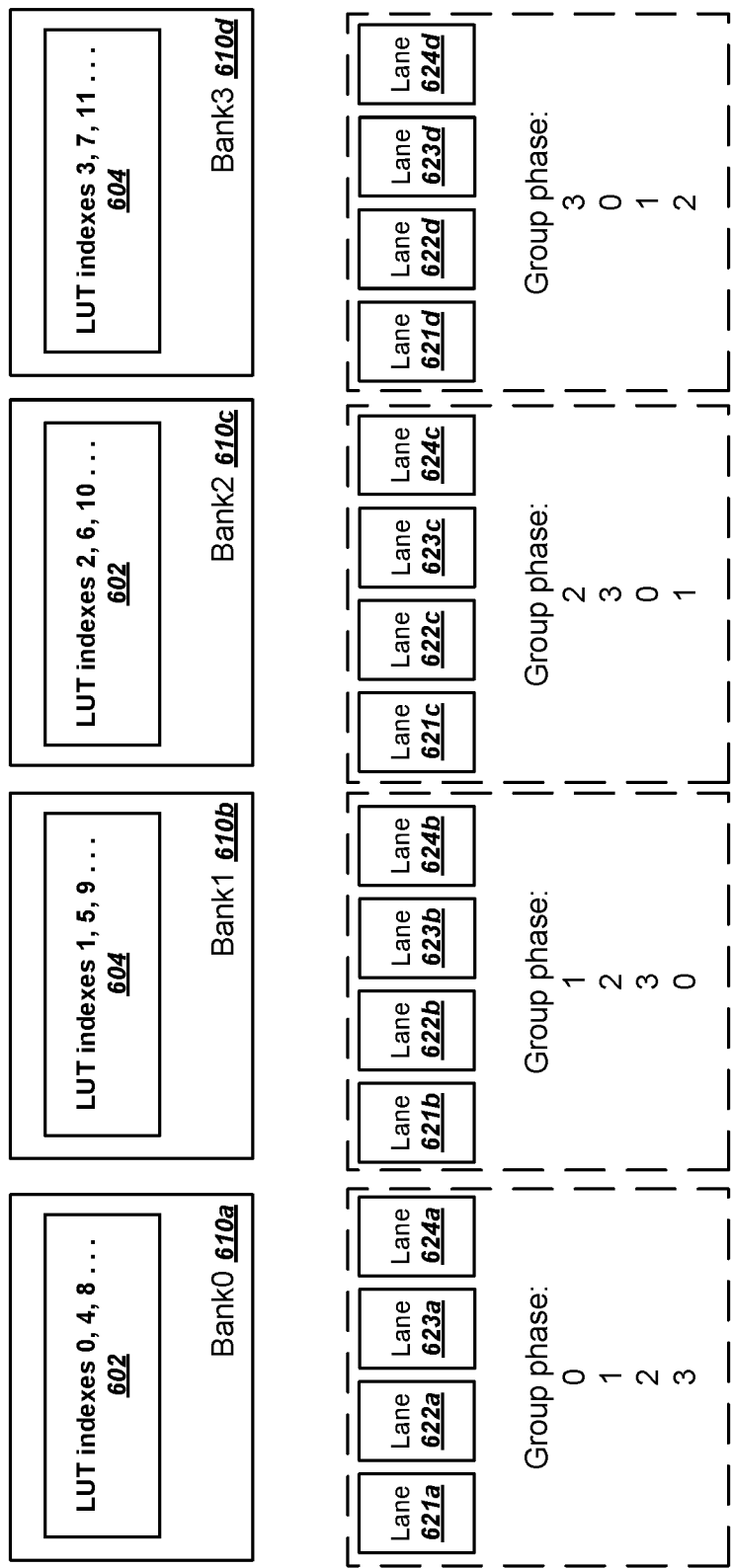
FIG. 6 illustrates different group phases for groups of execution lanes.

FIG. 6 illustrates different group phases for groups of execution lanes. In FIG. 6, a lookup table has been partitioned four ways such that Bank0 610a has indexes with a modulo value of zero. In other words, the partitioning arrangement means that no matter what index is in Bank0 610a, index % 4 will be zero. Similarly, the indexes in Bank1 610b have a modulo value of one, the indexes in Bank1 610c have a modulo value of two, and the indexes in Bank1 610d have a modulo value of three.

These modulo values determine the group phase for execution lanes that are local to those index values. The group phase specifies the order in which different positions of structured data will be read. As shown, the execution lanes 621a-624a have a group phase of 0, 1, 2, 3. This means that no matter which value is read from the lookup table, execution lanes having this group phase will always first read from Bank0 610a, then Bank1 610b, and so on. On the other hand, execution lanes having a group phase of 1, 2, 3, 0 will always first read the second value of the structured data from Bank1 610b.

In the following code snippet, the execution lane reads its internal configuration to compute its current group phase value. This code causes the execution lane to read the "y" position of the current lane inside the array (line 19); divide by a height of the lane groups, in this example 2 (line 20); add the element index within the vector and the vector base address to compute the address of the specific element and to handle any possible misalignment (lines 21-22), compute modulo N to determine the group index, (line 23), and get data back from the remote access (line 24).

```
// Compute lane position for transpose
   19, rdstat.b16 s1000 <- src1;
   20, shr.b16 t1014 <- s1000, 1;
   21, add.b16 t1015 <- t1014, 0;
   22, add.b16 t1026 <- t1015, 0;
   23, and.b16 t1027 <- t1026, 3;
   24, shift.b16 t1025 <- t1024, 0, 0;
```

As shown in FIG. 5, the execution lane stores the local LUT value in a transpose buffer in association with the computed position for transposition (525). The transpose buffer can be another allocated block of memory in the local memory bank of the execution lane. Alternatively, the transpose buffer can be a group of registers of the execution lane.

In either case, the execution lane writes the local LUT value to a position in the transpose buffer that corresponds to the phase of the execution lane's group. This means that the execution lane will store the read LUT value in the transpose buffer in association with its correct position in the structured data.

The follow code snippet takes the remote data in t1025 and stores the remote data at the computed index in t1027 in the transpose buffer. The transpose buffer in this example is represented as four memory-mapped registers (spill1012-spill1015).

```
// Store into transpose buffer
   25, vstpm.b16 spill1012, spill1013, spill1014,
   spill1015 <- memimm(255), t1027, t1025, internal1, null,
   null, null, null;
```

The execution lane shifts the partitioned index and receives a remote partitioned index (530). As described above with reference to FIG. 2, by shifting the partitioned indexes, each execution lane can perform a remote read for a different execution lane. In the running example, the following example code shifts the partitioned index to execution lanes in another group.

```
// Send index to neighboring group
26, shift.b16 t1028 <- t1013, 0, -2;
```

The execution lane reads a remote LUT value using the remote partitioned index (535). Because all execution lanes in a group may read from different addresses, these remote reads can also be serialized with load and mask instructions.

```
// Second table lookup (remote, lowered)
27, lddm.b16 t1029 <- 0, 1, t1028;
28, lddm.b16 t1030 <- t1029, 2, t1028;
29, lddm.b16 t1031 <- t1030, 4, t1028;
30, lddm.b16 t1032 <- t1031, 8, t1028;
31, lddm.b16 t1033 <- t1032, 16, t1028;
32, lddm.b16 t1034 <- t1033, 32, t1028;
33, lddm.b16 t1035 <- t1034, 64, t1028;
34, lddm.b16 t1036 <- t1035, 128, t1028;
```

The execution lane computes a position for transposition for the remote LUT value (540). In general, this can be accomplished by adding one the previous position modulo the number of partitions. In the running example, this can be accomplished by an "add" instruction and an "and" instruction.

```
// Compute lane position for transpose
35, add.b16 t1038 <- t1015, 1;
36, and.b16 t1039 <- t1038, 3;
```

The execution lane shifts the remote LUT value and receives a remote LUT value (545). In other words, the execution shifts back the LUT value that it read and receives a LUT value that another execution lane read for it.

```
// Send data back to neighboring group
37, shift.b16 t1037 <- t1036, 0, 2;
```

The execution lane stores the received remote LUT value in the transpose buffer in association with the position for transposition (550). In other words, the execution lane takes into account its group phase in order to store the newly read LUT value in the transpose buffer.

```
// Store into transpose buffer
38, vstpm.b16 spill1016, spill1017, spill1018,
spill1019 <- memimm(255), t1039, t1037, internal1,
spill1012, spill1013, spill1014, spill1015;
```

The execution lane then repeats steps 530-550 for every other remaining partition. Thus, if more partitions remain (555), the execution lane again shifts the partitioned index and receives a remote partitioned index (branch to 530).

In the running example, the subsequent instructions are similar to the second read sequence, expect that the shift distances change.

```
39, shift.b16 t1040 <- t1013, 0, -4;
40, lddm.b16 t1041 <- 0, 1, t1040;
41, lddm.b16 t1042 <- t1041, 2, t1040;
42, lddm.b16 t1043 <- t1042, 4, t1040;
43, lddm.b16 t1044 <- t1043, 8, t1040;
44, lddm.b16 t1045 <- t1044, 16, t1040;
45, lddm.b16 t1046 <- t1045, 32, t1040;
46, lddm.b16 t1047 <- t1046, 64, t1040;
47, lddm.b16 t1048 <- t1047, 128, t1040;
48, add.b16 t1050 <- t1015, 2;
49, and.b16 t1051 <- t1050, 3;
50, shift.b16 t1049 <- t1048, 0, 4;
51, vstpm.b16 spill1020, spill1021, spill1022,
spill1023 <- memimm(255), t1051, t1049, internal1,
spill1016, spill1017, spill1018, spill1019;
52, shift.b16 t1052 <- t1013, 0, -6;
53, lddm.b16 t1053 <- 0, 1, t1052;
54, lddm.b16 t1054 <- t1053, 2, t1052;
55, lddm.b16 t1055 <- t1054, 4, t1052;
56, lddm.b16 t1056 <- t1055, 8, t1052;
57, lddm.b16 t1057 <- t1056, 16, t1052;
58, lddm.b16 t1058 <- t1057, 32, t1052;
59, lddm.b16 t1059 <- t1058, 64, t1052;
60, lddm.b16 t1060 <- t1059, 128, t1052;
61, add.b16 t1062 <- t1015, 3;
62, and.b16 t1063 <- t1062, 3;
63, shift.b16 t1061 <- t1060, 0, 6;
64, vstpm.b16 spill1024, spill1025, spill1026,
spill1027 <- memimm(255), t1063, t1061, internal1,
spill1020, spill1021, spill1022, spill1023;
```

If no more partitions remain (555), the execution lane has successfully read all values for the structured data element.

Thus, the execution lane can use the data by reading from the transpose buffer (branch to 560).

In the running example, because the transposition buffer already contains all the data in the correct order, the read is straightforward

```
// Read data from transpose buffer
65, mmov.b16 t9 <- spill1024;
66, mmov.b16 t10 <- spill1025;
67, mmov.b16 t11 <- spill1026;
68, mmov.b16 tl2 <- spill1027;
```

Figure 7:
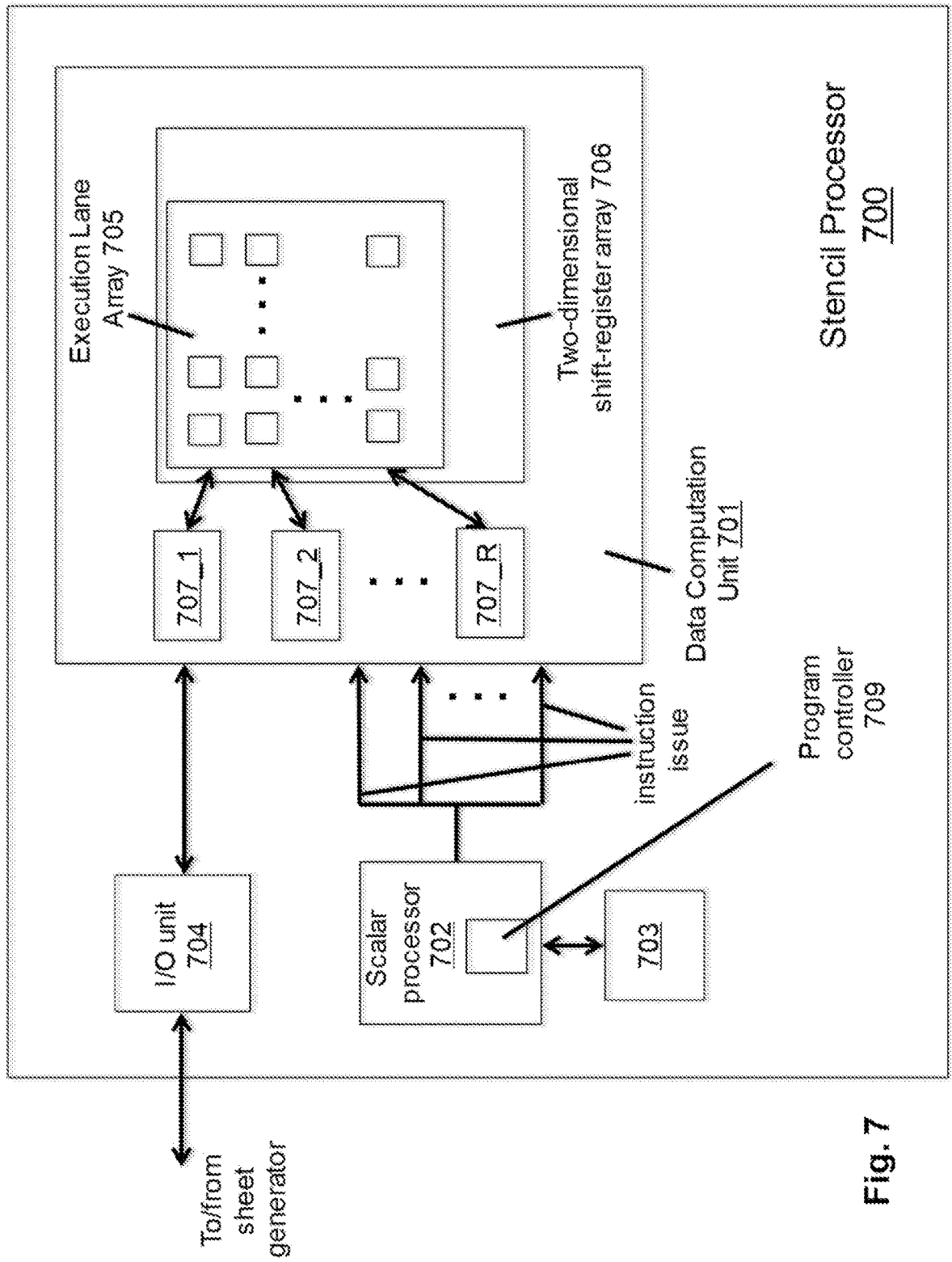
FIG. 7 illustrates the components of an example stencil processor.

FIG. 7 illustrates the components of an example stencil processor. A stencil processor is an example of a processing component that can be used by an image processor to carry out the techniques described above. An image processor can have one or more stencil processors, which can be programmed to coordinate in order to accomplish different stages of a processing task. Other suitable architectures, which may make use of stencil processors, are described in more detail in commonly owned U.S. patent application Ser. Nos. 14/694,828; 14/694,815; 14/694,806; 14/960,334; 15/352,260; which are herein incorporated by reference.

As shown in FIG. 7, a stencil processor 700 includes a data computation unit 701, a scalar processor 702, an associated scalar memory bank 703, and an I/O unit 704. The data computation unit 701 includes an execution lane array 705, a two-dimensional shift-register array 706 and separate random access memory banks 707_1 through 707_R that are each associated with respective rows or columns of the two-dimensional execution lane array 706.

The I/O unit 704 is responsible for loading input sheets of data received from a sheet generator of the image processor into the data computation unit 701 and storing output sheets of data from the image processor into the sheet generator. Loading sheets of input data into the data computation unit 701 can include parsing a received sheet into rows or columns of image data and loading the rows or columns of image data into the two-dimensional shift-register array 706 or into respective memory banks 707 of the rows/columns of the execution lane array. If the input sheet is initially loaded into memory banks 307, the individual execution lanes within the execution lane array 705 can then load sheet data into respective portions of the two-dimensional shift register array 706 from the random access memory banks 307 when appropriate, e.g., as a load instruction just prior to operation on the sheet's data. Upon completion of the loading of a sheet of data into the shift-register array 706 whether directly from a sheet generator or from memories 307, the execution lanes of the execution lane array 705 can operate on the data and eventually write the finished data as a sheet directly back to the sheet generator, or, into the random access memory banks 707. If the latter, the I/O unit 704 can fetch the data from the random access memory banks 707 to form an output sheet, which can then be forwarded to the sheet generator.

The scalar processor 702 includes a program controller 709 that can read the instructions of the stencil processor's program code from scalar memory 703 and issue the instructions to the execution lanes in the execution lane array 705. In some implementations, a single same instruction is broadcast to all execution lanes within the execution lane array 705 to effect a single instruction, multiple data-like behavior from the data computation unit 701. In some implementations, the instruction format of the instructions read from scalar memory 703 and issued to the execution lanes of the execution lane array 705 includes a very-long-instruction-word (VLIW) type format that includes more than one opcode per instruction. In a further embodiment, the VLIW format includes both an ALU opcode that directs a mathematical function to be performed by each execution lane's ALU and a memory opcode that directs a memory operation for a specific execution lane or set of execution lanes.

Each execution lane is a component having one or more execution units capable of executing an instruction, e.g., logic circuitry that can execute an instruction. An execution lane can include additional processor-like functionality beyond just execution units. For example, besides one or more execution units, an execution lane can also include logic circuitry that decodes a received instruction, or, in the case of more MIMD-like designs, logic circuitry that fetches and decodes an instruction. With respect to MIMD-like approaches, a distributed approach can be implemented in various alternative embodiments, e.g., with a program controller within each execution lane of the execution lane array 705.

The combination of an execution lane array 705, a program controller 709 and a two dimensional shift-register array 706 provides a widely adaptable and configurable hardware platform for a broad range of programmable functions. For example, application software developers can generate kernel programs having a wide range of different functional capability as well as dimension, e.g., stencil size, because the individual execution lanes are able to perform a wide variety of functions and are able to readily access input image data proximate to any output location in the two-dimensional shift-register array 706.

Apart from acting as a data store for image data being operated on by the execution lane array 705, the random access memory banks 707 can also keep one or more look-up tables. In various embodiments one or more scalar look-up tables may also be instantiated within the scalar memory 703. A scalar look-up involves passing the same data value from the same look-up table from the same index to each of the execution lanes within the execution lane array 705. The VLIW instruction format can include a scalar opcode that directs a look-up operation performed by the scalar processor into a scalar look-up table. The index that is specified for use with the opcode may be an immediate operand or fetched from some other data storage location. A look-up from a scalar look-up table within scalar memory 703 can involve broadcasting the same data value to all execution lanes within the execution lane array 705 during the same clock cycle.

Figure 8:
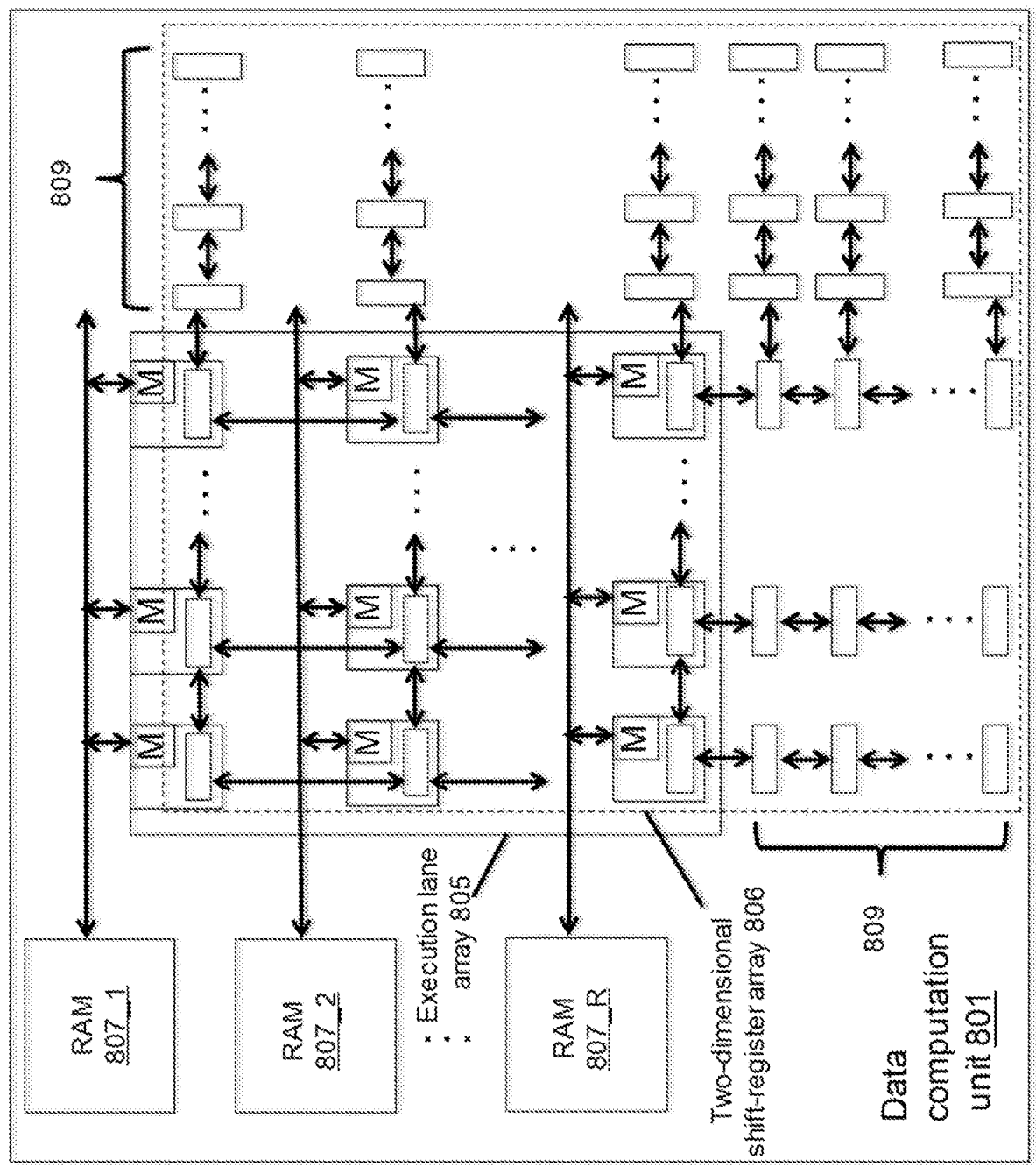
FIG. 8 illustrates an example data computation component.

FIG. 8 illustrates an example data computation component 801. As shown FIG. 8, the data computation component 801 includes an array of execution lanes 805 that are logically positioned "above" a two-dimensional shift-register array 806. As discussed above, in various embodiments, a sheet of image data provided by a sheet generator is loaded into the two-dimensional shift-register array 806. The execution lanes can then operate on the sheet data from the two-dimensional shift-register array 806.

The execution lane array 805 and shift-register array 806 are fixed in position relative to one another. However, the execution lanes can shift data within the shift-register array 806 in a strategic and coordinated fashion to cause each execution lane in the execution lane array 805 to have direct access to different input data. As such, each execution lane determines the output value for a different location in the output sheet being generated. From the architecture of FIG. 8, it should be clear that overlapping stencil regions can not only be arranged vertically but also horizontally because the execution lane array 805 includes vertically adjacent execution lanes as well as horizontally adjacent execution lanes.

Some notable architectural features of the data computation unit 801 include the shift-register array 406 having wider dimensions than the execution lane array 805. That is, there is a "halo" of registers 809 outside the execution lane array 805. Although the halo 809 is shown to exist on two sides of the execution lane array 805, depending on the implementation, the halo may exist on less (one) or more (three or four) sides of the execution lane array 805. The halo 809 serves to provide "spill-over" space for data that spills outside the bounds of the execution lane array 805 as the data is shifting "beneath" the execution lanes 805. As a simple case, a 5×5 stencil centered on the right edge of the execution lane array 805 may need four halo register locations further to the right when the stencil's leftmost pixels are processed. For ease of drawing, FIG. 8 illustrates the registers of the right side of the halo as only having horizontal shift connections and registers of the bottom side of the halo as only having vertical shift connections when, in a some implementations, registers on either side (right, bottom) would have both horizontal and vertical connections.

Additional spill-over room is provided by random access memory banks 807 that are coupled to each row and/or each column in the array, or portions thereof, e.g., a random access memory bank can be assigned to a "region" of the execution lane array 805 that spans 4 execution lanes row wise and 2 execution lanes column wise. For simplicity, some parts of this specification referred mainly to row and/or column based allocation schemes. Here, if an execution lane's kernel program operations require it to process pixel values outside of the two-dimensional shift-register array 806, which some image processing routines may require, the plane of image data is able to further spill-over, e.g., from the halo region 809 into a random access memory bank 807. For example, consider a 6×6 stencil in which the hardware includes a halo region of only four storage elements to the right of an execution lane on the right edge of the execution lane array. In this case, the data would need to be shifted further to the right off the right edge of the halo 809 to fully process the stencil. Data that is shifted outside the halo region 809 would then spill-over to random access memory 807.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a method comprising:

receiving an input kernel program for an image processor having a two-dimensional array of execution lanes, a shift-register array, and a plurality of memory banks, wherein multiple execution lanes in each of a plurality of groups of execution lanes are configured to share a same respective memory bank of the plurality of memory banks of the image processor;

determining that the kernel program has an instruction that reads a lookup table value for a lookup table partitioned across the plurality of memory banks; and in response, replacing the instruction in the kernel program with a sequence of instructions that, when executed by an execution lane, causes the execution lane to read a first value from a local memory bank and a second value from the local memory bank on behalf of another execution lane belonging to a different group of execution lanes.

Embodiment 2 is the method of embodiment 1, wherein the sequence of instructions causes an execution lane to perform operations comprising:

computing a local partitioned index from an original lookup table index;

reading a local lookup table value from a local memory bank using the local partitioned index;

shifting the local partitioned index through the shift-register array and receiving through the shift-register array a remote partitioned index from a different execution lane;

reading a remote lookup table value from the local memory bank using the remote partitioned index; and shifting the local partitioned index through the shift-register array and receiving through the shift-register array a remote partitioned index from a different execution lane.

Embodiment 3 is the method of embodiment 2, wherein the operations further comprise:

receiving a remote lookup table value read by a different execution lane from a remote memory bank.

Embodiment 4 is the method of embodiment 3, wherein the operations further comprise:

selecting between the local lookup table value or the remote lookup table value.

Embodiment 5 is the method of embodiment 4, wherein the operations further comprise:

selecting the local lookup table value if the original lookup table index modulo N is equal to a partition number of the execution lane, wherein N is a number of partitions of the lookup table.

Embodiment 6 is the method of any one of embodiments 1-5, wherein the sequence of instructions causes each execution lane to read multiple lookup table values for each single lookup table access in the input kernel program.

Embodiment 7 is the method of embodiment 6, wherein the lookup table is partitioned such that all even indexes are stored in a first memory bank and all odd indexes are stored in a second memory bank.

Embodiment 8 is the method of any one of embodiments 1-7, wherein the lookup table is larger than every one of the memory banks.

Embodiment 9 is the method of any one of embodiments 1-8, wherein each execution lane can only read from one respective memory bank of the plurality of memory banks.

Embodiment 10 is the method of any one of embodiments 1-9, wherein the lookup table value is a structured value having a width that is larger than a size of a register of the image processor, and wherein the sequence of instructions causes an execution lane to perform operations comprising:

reading a local lookup table value using a local partitioned index;

computing a position, in a transpose buffer, for the local lookup table value, wherein the position depends on a group phase of the execution lane; and storing the local lookup table value in the transpose buffer in association with the computed position.

Embodiment 11 is the method of embodiment 10, wherein the operations further comprise:

receiving a remote lookup table value read from a different memory bank by a different execution lane;

computing a second position, in the transpose buffer, for the remote lookup table value based on the group phase of the execution lane; and storing the remote lookup table value in the transpose buffer in association with the second position.

Embodiment 12 is the method of embodiment 10, wherein the structured value is a vector having multiple elements or a double-width data type.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

Embodiment 15 is a processor comprising:

a two-dimensional array of execution lanes;

a two-dimensional shift-register array; and a plurality of memory banks, wherein multiple execution lanes in each of a plurality of groups of execution lanes are configured to share a same respective memory bank of the plurality of memory banks of the processor, wherein each an execution lane is configured to execute a sequence of instructions to obtain a lookup table value, wherein the sequence of instructions causes each execution lane to perform operations comprising:

computing a local partitioned index from an original lookup table index;

reading a local lookup table value from a local memory bank using the local partitioned index;

shifting the local partitioned index through the shift-register array and receiving through the shift-register array a remote partitioned index from a different execution lane;

reading a remote lookup table value from the local memory bank using the remote partitioned index; and shifting the remote lookup table value back to the different execution lane through the shift-register array.

Embodiment 16 is the processor of embodiment 15, wherein the operations further comprise:

receiving a remote lookup table value read by a different execution lane from a remote memory bank.

Embodiment 17 is the processor of embodiment 16, wherein the operations further comprise:

selecting between the local lookup table value or the remote lookup table value.

Embodiment 18 is the processor of embodiment 17, wherein the operations further comprise:

selecting the local lookup table value if the original lookup table index modulo N is equal to a partition number of the execution lane, wherein N is a number of partitions of the lookup table.

Embodiment 19 is the processor of any one of embodiments 15-18, wherein the sequence of instructions causes each execution lane to read multiple lookup table values for each single lookup table access in the input kernel program.

Embodiment 20 is the processor of embodiment 19, wherein the lookup table is partitioned such that all even indexes are stored in a first memory bank and all odd indexes are stored in a second memory bank.

Embodiment 21 is the processor of any one of embodiments 15-20, wherein the lookup table is larger than every one of the memory banks.

Embodiment 22 is the processor of any one of embodiments 15-21, wherein each execution lane can only read from one respective memory bank of the plurality of memory banks.

Embodiment 23 is the processor of any one of embodiments 15-22, wherein the lookup table value is a structured value having a width that is larger than a size of a register of the image processor, and wherein the sequence of instructions causes an execution lane to perform operations comprising:
  reading a local lookup table value using a local partitioned index;
  computing a position, in a transpose buffer, for the local lookup table value, wherein the position depends on a group phase of the execution lane; and
  storing the local lookup table value in the transpose buffer in association with the computed position.

Embodiment 24 is the processor embodiment 23, wherein the operations further comprise:
  receiving a remote lookup table value read from a different memory bank by a different execution lane;
  computing a second position, in the transpose buffer, for the remote lookup table value based on the group phase of the execution lane; and
  storing the remote lookup table value in the transpose buffer in association with the second position.

Embodiment 25 is the processor of embodiment 23, wherein the structured value is a vector having multiple elements or a double-width data type.

Embodiment 26 is a method comprising performing the operations of any one of embodiments 15-25.

Embodiment 27 is a computer storage medium encoded with a computer program, the program comprising instructions that are operable, when executed by a processor, to cause the processor to perform the operations of any one of embodiments 15-25.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
  receiving an input kernel program for an image processor having a two-dimensional array of execution lanes, a shift-register array, and a plurality of memory banks, wherein multiple execution lanes in each of a plurality of groups of execution lanes are configured to share a same respective memory bank of the plurality of memory banks of the image processor;
  determining that the kernel program has an instruction that reads a lookup table value for a lookup table partitioned across the plurality of memory banks; and
  in response, replacing the instruction in the kernel program with a sequence of instructions that, when executed by an execution lane, causes the execution lane to perform operations comprising:
    reading a local lookup table value from a local memory bank using a local partitioned index,
    shifting the local partitioned index through the shift-register array and receiving through the shift-register array a remote partitioned index from a different execution lane,
    reading a remote lookup table value from the local memory bank using the remote partitioned index, and
    shifting the remote lookup table value back to the different execution lane through the shift-register array.

2. The method of claim 1, wherein the sequence of instructions causes an execution lane to further perform operations comprising:
  computing the local partitioned index from an original lookup table index of the kernel program using integer division by a number of partitions of the lookup table.

3. The method of claim 1, wherein the operations further comprise:
  receiving a remote lookup table value read by a different execution lane from a remote memory bank.

4. The method of claim 3, wherein the operations further comprise:
  selecting between the local lookup table value or the remote lookup table value.

5. The method of claim 4, wherein the operations further comprise:
  selecting the local lookup table value if an original lookup table index modulo N is equal to a partition number of the execution lane, wherein N is a number of partitions of the lookup table.

6. The method of claim 1, wherein the sequence of instructions causes each execution lane to read multiple lookup table values for each single lookup table access in the input kernel program.

7. The method of claim 6, wherein the lookup table is partitioned such that all even indexes are stored in a first memory bank and all odd indexes are stored in a second memory bank.

8. The method of claim 1, wherein the lookup table is larger than every one of the memory banks.

9. The method of claim 1, wherein each execution lane can only read from one respective memory bank of the plurality of memory banks.

10. The method of claim 1, wherein the lookup table value is a structured value having a width that is larger than a size of a register of the image processor, and wherein the sequence of instructions causes an execution lane to perform operations comprising:
   reading a local lookup table value using a local partitioned index;
   computing a position, in a transpose buffer, for the local lookup table value, wherein the position depends on a group phase of the execution lane; and
   storing the local lookup table value in the transpose buffer in association with the computed position.

11. The method of claim 10, wherein the operations further comprise:
   receiving a remote lookup table value read from a different memory bank by a different execution lane;
   computing a second position, in the transpose buffer, for the remote lookup table value based on the group phase of the execution lane; and
   storing the remote lookup table value in the transpose buffer in association with the second position.

12. The method of claim 10, wherein the structured value is a vector having multiple elements or a double-width data type.

13. A system comprising:
   one or more computers and one or more storage devices storing instructions that are operable, when executed by the one or more computers, to cause the one or more computers to perform operations comprising:
   receiving an input kernel program for an image processor having a two-dimensional array of execution lanes, a shift-register array, and a plurality of memory banks, wherein multiple execution lanes in each of a plurality of groups of execution lanes are configured to share a same respective memory bank of the plurality of memory banks of the image processor;
   determining that the kernel program has an instruction that reads a lookup table value for a lookup table partitioned across the plurality of memory banks; and
   in response, replacing the instruction in the kernel program with a sequence of instructions that, when executed by an execution lane, causes the execution lane to perform operations comprising:
      reading a local lookup table value from a local memory bank using a local partitioned index,
      shifting the local partitioned index through the shift-register array and receiving through the shift-register array a remote partitioned index from a different execution lane,
      reading a remote lookup table value from the local memory bank using the remote partitioned index, and
      shifting the remote lookup table value back to the different execution lane through the shift-register array.

14. The system of claim 13, wherein the sequence of instructions causes an execution lane to further perform operations comprising:
   computing the local partitioned index from an original lookup table index of the kernel program using integer division by a number of partitions of the lookup table.

15. The system of claim 13, wherein the operations further comprise:
   receiving a remote lookup table value read by a different execution lane from a remote memory bank.

16. The system of claim 15, wherein the operations further comprise:
   selecting between the local lookup table value or the remote lookup table value.

17. The system of claim 16, wherein the operations further comprise:
   selecting the local lookup table value if an original lookup table index modulo N is equal to a partition number of the execution lane, wherein N is a number of partitions of the lookup table.

18. The system of claim 13, wherein the sequence of instructions causes each execution lane to read multiple lookup table values for each single lookup table access in the input kernel program.

19. The system of claim 18, wherein the lookup table is partitioned such that all even indexes are stored in a first memory bank and all odd indexes are stored in a second memory bank.

20. The system of claim 13, wherein the lookup table is larger than every one of the memory banks.

21. A computer program product, encoded on one or more non-transitory computer storage media, comprising instructions that when executed by one or more computers cause the one or more computers to perform operations comprising:
   receiving an input kernel program for an image processor having a two-dimensional array of execution lanes, a shift-register array, and a plurality of memory banks, wherein multiple execution lanes in each of a plurality of groups of execution lanes are configured to share a same respective memory bank of the plurality of memory banks of the image processor;
   determining that the kernel program has an instruction that reads a lookup table value for a lookup table partitioned across the plurality of memory banks; and
   in response, replacing the instruction in the kernel program with a sequence of instructions that, when executed by an execution lane, causes the execution lane to perform operations comprising:
      reading a local lookup table value from a local memory bank using a local partitioned index,
      shifting the local partitioned index through the shift-register array and receiving through the shift-register array a remote partitioned index from a different execution lane,
      reading a remote lookup table value from the local memory bank using the remote partitioned index, and
      shifting the remote lookup table value back to the different execution lane through the shift-register array.

* * * * *